United States Patent [19]

Rönisch

[11] Patent Number: 5,731,684
[45] Date of Patent: Mar. 24, 1998

[54] METHOD AND APPARATUS FOR REGENERATING PRIMARY CELLS

[75] Inventor: Werner Rönisch, Zeuthen, Germany

[73] Assignee: Uli Rotermund, Ilensburg, Germany

[21] Appl. No.: 810,739

[22] Filed: Dec. 27, 1996

Related U.S. Application Data

[63] Continuation-in-part of Ser. No. 210,594, Mar. 17, 1994, abandoned.

[30] Foreign Application Priority Data

Mar. 17, 1993 [DE] Germany ............... 43 08 530.5

[51] Int. Cl.$^6$ ............... H01M 10/44; H01M 10/46
[52] U.S. Cl. ............... 320/3; 320/21
[58] Field of Search ............... 320/3, 4, 21, 31, 320/32, 39

[56] References Cited

U.S. PATENT DOCUMENTS

| | | |
|---|---|---|
| 4,935,688 | 6/1990 | Mistry et al. ............... 320/4 |
| 5,463,304 | 10/1995 | Winters ............... 320/4 |
| 5,543,701 | 8/1996 | Leung et al. ............... 320/4 |

*Primary Examiner*—Edward Tso
*Attorney, Agent, or Firm*—Klaus J. Bach

[57] ABSTRACT

In a method and apparatus for regenerating a primary cell, voltage pulses of a predetermined amplitude and a predetermined duration in the range of $10^{-3}$ to $2\times10^{-3}$ seconds are applied to the primary cell at a frequency of 2 Hz to 200 Hz whereby primary cells which cannot be recharged can be reconditioned for a greatly extended life. The apparatus includes a switching device with a low voltage input connected to a low resistance DC voltage source, an output delivering a sequence of voltage pulses to a primary cell, and a timing generator for timing the switching device.

12 Claims, 2 Drawing Sheets

METHOD AND APPARATUS FOR REGENERATING PRIMARY CELLS

This is a Continuation-In-Part application of patent application Ser.No. 08/210,594 filed Mar. 17,1994 which is now abandoned.

BACKGROUND OF THE INVENTION

The present invention relates to a method for regenerating primary cells with electrical energy supplied thereto as well as an apparatus for performing the method.

Primary cells, that is, disposable voltage sources, which, by definition, can not be recharged have become indispensable in daily life and are used for supplying different devices, apparatus or appliances with electric energy. Primary cells of the aforementioned kind are, for example, manganese, alkali, zinc-carbon or other batteries which all have in common that, after a certain amount of operating time, only such a low voltage is present at their poles that the desired operation of the electric power consuming device connected thereto is no longer possible.

Due to the electro-chemical changes in the interior of such primary cells, the initial voltage is reduced and a change of the inner resistance in the cells takes places so that the output power of such cells is reduced at the rate at which the nominal voltage drops. Typically, a primary cell initially has a voltage of 1.5 V. A cell of this kind is considered spent when the voltage falls to 1–1.2 V.

In general, such spent cells are disposed of as domestic or industrial waste which, in view of the material and the chemical composition of the components of such primary cells, is highly objectionable, or even dangerous with respect to environmental considerations. In the recent past, efforts have been made to collect such spent cells at special collection locations in order to subject them to a controlled recycling process. However, a cell of the aforementioned kind is often considered spent, as mentioned above, when the voltage drops below 1 to 1.2 V even though the components of the cells are still intact.

In this context, it should be noted that the voltage of the primary cell which changes over time of use and the accompanying reduction of current supply is essentially only determined by the reactions taking place in the interior of the cell during the time of use.

Various attempts have been undertaken and various methods have been suggested for recycling the primary cells that are spent in the aforementioned sense, with the goal that these cells should be able to supply power for a further period of time. However, with the methods known to date a truly effective regeneration is not possible or possible only to a limited extent.

It is thus an object of the present invention to provide a method and an apparatus for the regeneration of primary cells in such a way that the power output of an essentially unused primary voltage supply cell can be achieved. The method should be simple to perform and the apparatus inexpensive to manufacture so that they can be utilized at low cost and find wide-spread use.

SUMMARY OF THE INVENTION

In a method for regenerating a primary cell, periodic voltage impulses of a predetermined impulse duration are applied to the primary cell.

Further, an apparatus is provided which includes a DC voltage source connected to a switching device with an output for connection to a primary cell for applying thereto a sequence of voltage pulses and a timing device for timing the switching device.

Primary cells have a relatively short life. They are considered spent when, at a certain load, their voltage drops below a certain value. It has been found however during examinations of the internal physical and electrochemical constitution of "spent" primary cells that their positive electrodes and their so-called depolarizors were essentially unchanged. Only the negative electrode showed some traces of decomposition.

It was further found in extended scientific investigations of the electrochemical processes occurring in the primary cells and the reaction of the primary cells to the application of various different voltages and current impulses that, with a particular impulse form, an effective regeneration of the "spent" cells can be achieved. Microscopic examinations of special cells built specifically for this purpose have revealed that during discharge of the primary cell, small hydrogen bubbles form on the positive electrode whereby the current flow diminishes at the rate at which the formation of hydrogen bubbles increases. Since the hydrogen layer so formed has a positive charge, that is, the same charge as the positive electrode of the cell, the electrode becomes more and more insulated whereby the capability of the primary cell to deliver an electric current is more and more inhibited.

Since the oxidizing agents (depolarizors) included in a primary cell can oxidize the hydrogen formed on the cathode only for a limited discharge period (hours), that is, until the voltage drops below an effective value, the cell is considered "spent" although its chemical and physical components are still in good condition. It was found that such a cell could be reconditioned with the method according to the invention up to 10 times and even more often depending on the age of the cell and the quality of its components.

Preferably, the voltage impulses have a short ascending time and/or a short descending time (square pulse form), the impulse duration is in a range $10^{-3}$ seconds to $2 \times 10^{-3}$ seconds, and the voltage impulses are provided in a frequency range of 2 Hz to 200 Hz.

A current of $5 \times 10^{-2}$ A to 15 A was found to be suitable. Advantageously, the current is controlled depending on the inner resistance of the primary cell to be regenerated.

The primary cell to be regenerated is subjected to the regeneration pulses for a predetermined time period. The regenerated is periodically supplied voltage pulses of a predetermined amplitude and predetermined pulse duration.

The advantage of the inventive method lies in the fact that the primary cell can be regenerated such that, as desired, a power output is achievable that is in fact almost identical to the power output of a new primary cell which has never been used.

The inventive method has furthermore the advantage that it permits multiple regenerations of the primary cell after multiple discharges whereby, after each regeneration process, approximately the initial power output can be reached. With the inventive method not only raw materials are saved but the disposal problem is also reduced, as a primary cell must be disposed of only after multiple regeneration processes that is when in fact an inner irreparable destruction has occurred.

Preferably, the voltage pulses have a short ascending time and a short descending time, i.e., the voltage impulses have very steep flanks. It has been found that such pulses increase of the regenerating effect.

The impulse duration preferably lies between $10^{-3}$ seconds to $2 \times 10^{-3}$ seconds. However, the impulse duration is variably adjustable depending on the state of the cell to be regenerated and also as a function of other parameters, if necessary.

Advantageously, the frequency of the voltage impulses is also variable I preferably within a range of 2 to 200 Hz.

The regenerating current is adjustable preferably within a range of $5 \times 10^{-2}$ A to 15 A. It is also possible, for example, to adjust the range of the regenerating current at a fixed rate, i.e., to perform the regeneration process with a constantly pulsed current and to change voltage impulse amplitudes as a function of the regenerating state of the primary cell. However, it is also possible to provide for an automatic adjustment of the regenerating current as a function of the inner resistance of the primary cell to be regenerated wherein the voltage impulses are preset to have a constant amplitude.

The present invention also relates to an apparatus for regenerating a primary cell by electric impulses. This apparatus includes a low resistance DC voltage source, which is connected via a switching device having an input and an output to a pole of the primary cell to be regenerated, the output delivering a sequence of voltage pulses. A timing generator is connected to the switching device for timing the switching device.

Advantageously, the switching device also includes means for controlling the amplitude of the voltage pulses.

Expediently, the switching device comprises a control device for controlling the current of the electric energy.

Advantageously, the control device controls the current as a function of the changing inner resistance of the primary cell to be regenerated.

In a further embodiment of the present invention, the device further comprises a timing member for adjusting a regeneration time period for the primary cell.

The apparatus according to the invention can be assembled in a simple manner from inexpensive components so that it has low manufacturing costs and can thus also be mass produced and can be widely used in private households in and in industry. Such a device will be commonly distributed via electric equipment distribution networks present everywhere. Also the required primary energy is generally available so that no expensive technical measures are required for a respective adaptation, i.e., commercial voltage transformers and/or adapters can be used. Advantageously, the switching device has an adjusting member for setting the amplitude of the voltage impulses. Preferably, the apparatus also comprises a control device for controlling the regenerating current if desired to maintain the current at a constant level while the amplitude of the voltage impulses is adjusted as a function of the degree of regeneration of the primary cell.

The operating characteristics (parameters) of the control device can advantageously be selected as a function of the degree of regeneration of the voltage supply element and the respective internal resistance of the cell. However, it is also possible to select a different control characteristic, if needed, as a function of the primary cell to be regenerated, particularly if special regenerating characteristics are desired or necessary.

It is also advantageous if the time period for regenerating the primary cell can be predetermined, or respectively, set to a certain value. This value is adjustable by means of a timing member so that, after completion of a regenerating cycle the regeneration process is automatically terminated, i.e., the electric energy source is switched off.

BRIEF DESCRIPTION OF THE DRAWINGS

The present invention will become more readily apparent from the following description thereof on the basis of the accompanying drawings, in which.

DESCRIPTION OF PREFERRED EMBODIMENTS the present invention will now be described in detail with the aid of several specific embodiments utilizing FIGS. 1 through 4.

Figure 1:
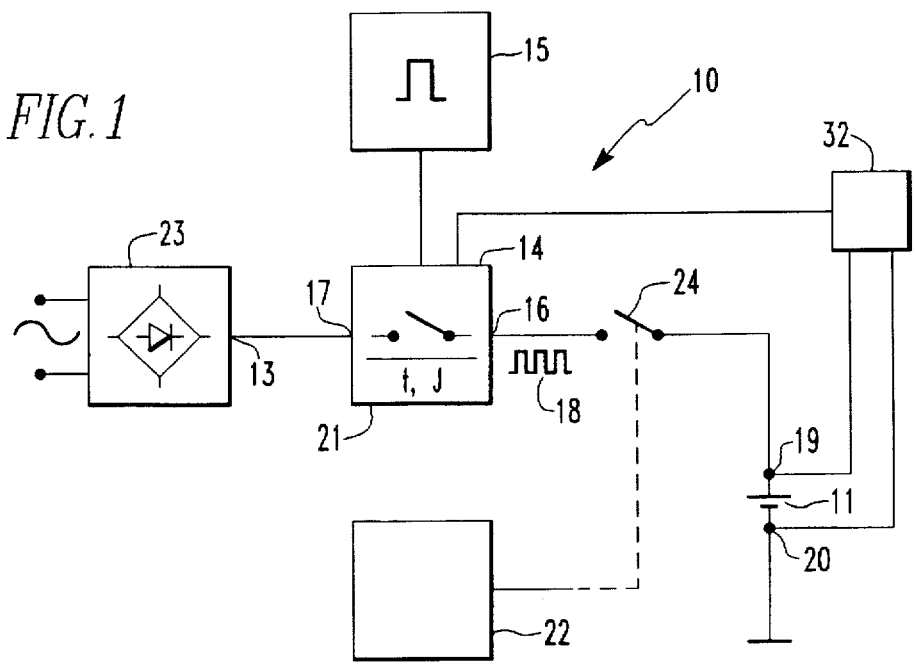
FIG. 1 is a block diagram showing schematically a device for regenerating primary cells.

The device 10 for performing the method of the present invention will first be described on the basis of FIG. 1 showing a block diagram. A low resistance DC primary voltage source 23 may be in the form of a suitably dimensioned adapter that can be connected with its input to a suitable AC network in a suitable manner. The DC voltage source 23 supplies, in a known manner, a DC signal 13 to the input 17 of a switching device 14. The switching device 14 is directly controlled by a timing generator 15 which functions such that the DC signal 13 is changed into a sequence of voltage pulses 18 at the output 16 which are adjustable with respect to pulse duration via an adjusting member 21 that also cooperates with the timed switching device 14. The impulse duration of a semi-period of the impulse sequence 18 is preferably between $10^{-3}$ to $2 \times 10^{-3}$ seconds long.

The adjusting member 21 may also be provided with adjusting elements, that is, with control members by which the regenerating current is adjustable within a range of $5 \times 10^{-2}$ A to 15A.

The timing generator 15 is also adjustable, or controllable such that the frequency of the voltage pulses of the sequence 18 is adjustable, for example, in the range of 2 to 200 Hz.

The timing member 22 is connected to a switch 24 such that the voltage impulse sequence 18 from the output 16 of the timed switching device 14 is connected to a pole 19 of the primary cell 11 to be regenerated. The other pole 20 of the primary cell 11 is connected in a conventional manner to the other pole of the DC voltage source 23; in the shown example, it is connected to ground. The timing member 22 may be adjustable so that in a predetermined manner the process of regenerating the primary cell 11 with the sequence 18 of voltage pulses can be performed in a predetermined time period. When the end of the predetermined time period is reached, the electrical switch 24 is opened so that the voltage pulse sequence 18 is no longer applied to the primary cell 11.

It should be noted that the device 10 may also be designed such that regenerating current can be adjusted to a constant level as a function of the internal resistance of the primary cell 11 to be regenerated (constant current regenerating mode). However, the current may also automatically be adjusted depending on the changing internal resistance of the primary cell 11. For this purpose a sensor 32 may be connected to the poles 19 and 20 of the primary cell 11 for determining the internal resistance of the primary cell at least periodically while it is reconditioned and the value sensed thereby is supplied to the switching device 14 for controlling the current supplied to the to the output 16.

Figure 2:
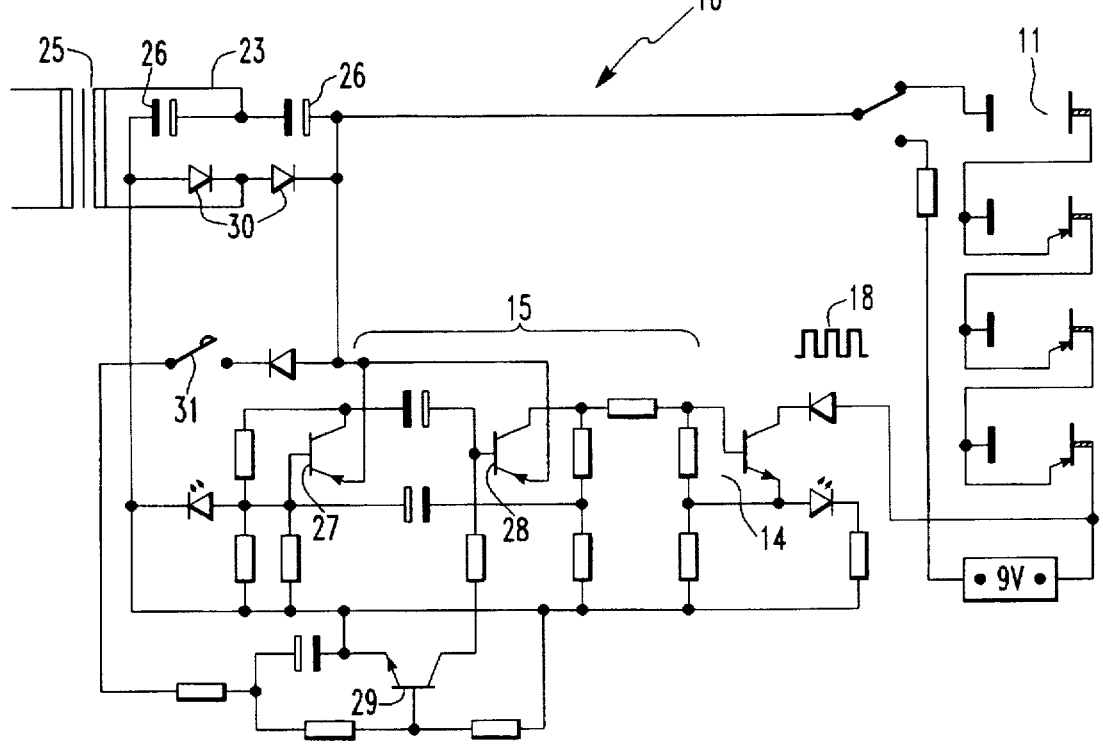
FIG. 2 shows an embodiment of a device as shown in FIG. 1 with details of the circuitry.

FIG. 2 shows a circuit diagram for the device according to FIG. 1.

Voltage is supplied to the device via a conventional electric power supply network by way of a transformer 25. Two capacitors 26 are connected with one pole of the secondary side of the transformer 25 and two diodes 30 are connected with the other pole. Accordingly, as known per se, a low resistance DC voltage source for supply voltage to the device 10 is provided.

The steep-flanked (square) impulses for the highly effective regeneration are generated by the timing generator, or pulse generator 15. The generator 15 works as an asymmetric multi-vibrator together with the transistors 27 and 28 and generates the required pulses with a pulse sequence frequency of 2 to 5 Hz. Via further pulse forming circuits, these pulses are subsequently guided to the electronic switch 14 and amplified. Subsequently, these voltage pulses are guided to the part of the device into which the primary cells to be regenerated are inserted. In order to protect the device 10 and the primary cells 11 to be regenerated, the circuit of the device 10 may be provided with an automatic shut-off device 29 that limits the regenerating process to a predetermined time period, for example, a maximum of 25 minutes. By pressing the timing key 31 again, the regenerating process may be reactivated for the predetermined time period if this should be necessary.

Figure 3:
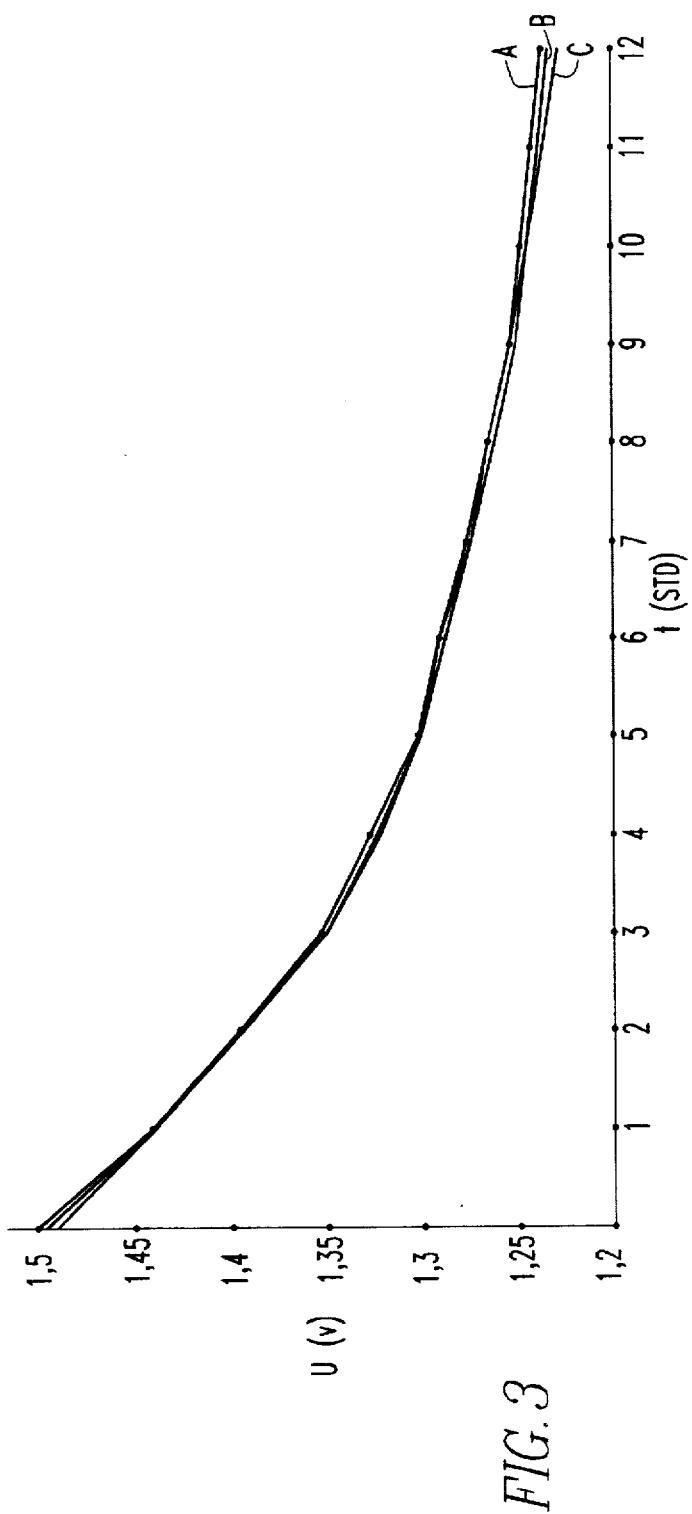
FIG. 3 shows the voltage provided by a primary cell as a function of time for the primary cell with a load of 6 ohm corresponding to 250 mA, whereby curve A shows a new voltage source, curve B shows the voltage after a first regeneration process, and curve C shows the voltage after a second regeneration process.

FIG. 3 shows the voltage of a primary cell as a function of time during discharge through a load having a resistance of 6 ohm providing initially approximately for a 250 mA current. After approximately 12 hours, the voltage of the voltage supplying primary cell 11 has been reduced from 1.5 V to 1.2 V. 250 mA corresponds approximately to the current consumption of an incandescent light bulb as typically used in flashlights. The first discharge of the primary cell 11 is represented by curve A in FIG. 3. Curve A represents a new primary cell 11 which has never been used before.

After a first regeneration process over a time period of approximately 20 minutes, the regenerated primary cell provides a nominal voltage of again almost 1.5 V. A subsequent discharge of the regenerated primary cell 11 with the same load parameters for a time period of 12 hours is represented by curve B. Curve B is almost identical to the first load curve A. A subsequent second regenerating process with the inventive method and device 10 over a time period of 20 minutes again results in a nominal voltage of the primary cell of approximately 1.5 V. A third discharge with the same load parameters as used in the first and second discharges is represented by Curve C. Curve C only slightly deviates from the previous curves A and B.

Experiments have shown that commercially available primary cells of good quality can be regenerated at least 10 times in the aforementioned manner without exhibiting a significant power output decrease.

With the method according to the invention, it is thus possible to reverse certain chemical, or respectively, electrochemical reactions taking place in the interior of the primary cell 11. During the normal electrochemical reactions which occur with an electrical consuming device connected to primary cells, deposits form on the electrodes. These deposits have an insulating effect. With the inventive method and the inventive device 10 the electrodes are freed of the insulating deposits so that an almost complete regeneration of the primary cell and re-establishment of its initial power output, and capacity are obtainable.

Figure 4:
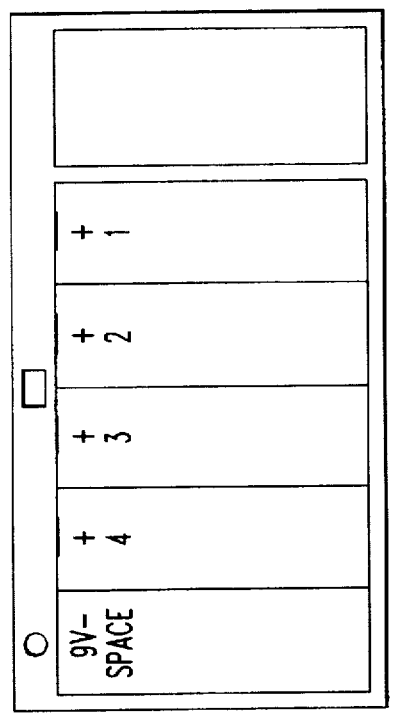
FIG. 4 is a plan view of a housing of an apparatus for receiving a plurality of primary cells to be regenerated.

FIG. 4 shows a housing for the device 10 for receiving a plurality of primary cells 11. The housing may receive different primary cells 11 which may be regenerated individually or simultaneously.

It should be noted that the method and the device 10 according to the invention, are not only suitable for regenerating primary cells 11, but it may also be used for a quick charging of secondary voltage supply elements, i.e., different types of batteries if no normal constant voltage charger is available.

The present invention is of course, in no way restricted to the specific embodiments disclosed in the specification and drawings, but also encompasses any modifications within the scope of the appended claims.

What is claimed is:

1. A method for regenerating a primary cell comprising the step of:

applying to said primary cell voltage pulses of a predetermined amplitude and a predetermined pulse duration in the range of $10^{-3}$ to $2\times10^{-3}$ seconds and at a frequency of 2 Hz to 200 Hz.

2. A method according to claim 1, wherein said voltage pulses have a short ascending time.

3. A method according to claim 1, wherein said voltage pulses have a short descending time.

4. A method according to claim 1, wherein voltage pulses have short ascending and short descending times.

5. A method according to claim 1, wherein said primary cell is subjected during reconditioning to an electric current of $5\times10^{-2}$ A to 15 A.

6. A method according to claim 5, wherein said current is adjusted depending on the internal resistance of the primary cell to be regenerated.

7. A method according to claim 5, wherein said step of producing said electric current includes the step of automatically adjusting and controlling said current as a function of an inner resistance of the primary element to be regenerated.

8. A device for regenerating a primary cell by subjecting the primary cell to electric energy pulses, said device comprising:

a switching device having an input and an output for connecting said switching device to a pole of said primary cell to be regenerated, said output delivering a sequence of voltage pulses;

a low resistance DC voltage source connected to said input; and a timing generator connected to said switching device for timing said switching device.

9. A device according to claim 8, wherein said switching device includes an adjusting member for adjusting an amplitude of the voltage pulses.

10. A device according to claim 9, wherein said switching device includes a control device for controlling the current of the electric energy pluse.

11. A device according to claim 10, wherein said control device includes means for controlling the current as a function of the changing internal resistance of said primary cell to be regenerated.

12. A device according to claim 11, further comprising a timing member for setting a regeneration time period for said primary cell.

* * * * *